(12) United States Patent
Kawamura

(10) Patent No.: US 6,282,597 B1
(45) Date of Patent: Aug. 28, 2001

(54) INFORMATION PROCESSING APPARATUS, CONTROL METHOD, AND TRANSMISSION MEDIUM USING THIN PROTOCOL THAT RESPONDS TO A/V CONTROL COMMANDS

(75) Inventor: Harumi Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/174,333

(22) Filed: Oct. 19, 1998

(30) Foreign Application Priority Data

Oct. 21, 1997 (JP) .................................................. 9-288481

(51) Int. Cl.⁷ .................................................. G06F 13/42
(52) U.S. Cl. .......................... 710/105; 710/58; 710/106; 710/8; 710/9; 710/10; 709/328
(58) Field of Search ................................... 370/254, 219, 370/389; 711/4; 712/20, 220; 455/412; 710/106, 58, 105, 104, 8, 9, 10; 714/746; 709/328

(56) References Cited

U.S. PATENT DOCUMENTS

| | | | | |
|---|---|---|---|---|
| 5,420,852 | * | 5/1995 | Anderson et al. | 370/364 |
| 5,828,656 | * | 10/1998 | Sato et al. | 370/254 |
| 5,915,127 | * | 6/1999 | Ogawa et al. | 710/58 |
| 5,940,600 | * | 8/1999 | Staats et al. | 710/107 |
| 5,987,126 | * | 11/1999 | Okuyama et al.. | 380/5 |
| 6,018,816 | * | 1/2000 | Tateyama | 714/746 |

* cited by examiner

Primary Examiner—Rupal D. Dharia
(74) Attorney, Agent, or Firm—Jay H. Maioli

(57) ABSTRACT

Use of a Thin protocol in an AV/C command is made possible. A TO (Thin Output) plug that conforms to the Thin protocol is provided in a disk camera which transmits data. In a similar manner, a TI (Thin Input) plug that conforms to the Thin protocol is provided in a printer which receives data.

2 Claims, 11 Drawing Sheets

FIG. 5

Printer subunit dependent information

| Printer_engine_specification |
|---|
| number_of_printing_format |
|    format [0]_specification |
|      ⋮ |
|    format [ n-1 ]_specification |

FIG. 6

Printer_Subunit_Status_Descriptor

| descriptor_length |
|---|
| general_printer_status(DURING PRINTING / PAPER JAM / OUT OF PAPER / etc.) |
| number_of_printing_queues (n) |
|    queue [0]_status |
|      ⋮ |
|    queue [ n-1 ]_status |

FIG. 7

Printer_subunit_command

| opcode | PRINT |
|---|---|
| operand [0] | queue_id |
| operand [1] | subfunction (execute / stop / pending / etc. ) |
| operand [2] | subfunction_specification |
| ⋮ | ⋮ |

FIG. 8

Printer_status_notify_command

| opcode | PRINTER STATUS |
|---|---|
| operand [0] | queue_id |
| operand [1] | FF |

FIG. 12

Plug object : entry_specific_information

| number_of_supported_data_type (1) |
| --- |
| data_type [0]        ( still image) |
| number_of_supported_data_format (m) |
| data_format [0]     (JPEG) |
| ⋮ |
| data_format [m-1]  (Raw RGB) |
| number_of_supported_transmission_format (n) |
| transmission_format [0]     (Vendor Unique) |
| ⋮ |
| transmission_format [n-1]   (Push) |
| ⋮ |
| data_type [l-1]         (command) |
| ⋮ |

FIG. 13

| | | | | |
| --- | --- | --- | --- | --- |
| opcode | CONNECT | | | |
| operand [0] | 3F | | lock | perm |
| operand [1] | Source_subunit_type (3) | | source_subunit_ID (0) | |
| operand [2] | Source_Plug (0) | | | |
| operand [3] | destination_subunit_type (IF) | | destination_subunit_ID (7) | |
| operand [4] | destination_plug (FC) | | | |
| operand [5] | Thin_connect_ID (FF) | | | |
| operand [6] | Thin_channel_ID (FF) | | | |

FIG. 14

Connection object : entry_specific_information

| |
|---|
| connection_control  (Connect_req / Disconnect_Req / Neutral) |
| connection_status  (Connected / Connect_interim / Disconnected / Disconnect_interim / Bus_reset) |
| connection node    node_unique_id |
| connection node    node_id |
| transmission_model (PUSH / PULL / ISO / Vendor_Unique) |
| data_size |

FIG. 15

Channel object : entry_spesific_information

| | |
|---|---|
| send_data_control (Send_req / Abort_req / Neutral) | |
| send_data_status  (Send / Send_interim / Abort / Abort_interim / Neutral / Bus_reset) | |
| data_type | (still image / command / text data / etc.) |
| data_format | (Raw RGB / JPEG / etc.) |

INFORMATION PROCESSING APPARATUS, CONTROL METHOD, AND TRANSMISSION MEDIUM USING THIN PROTOCOL THAT RESPONDS TO A/V CONTROL COMMANDS

BACKGROUND OF THE INVENTION

1. Field of the Invention

The present invention relates to an information processing apparatus, a control method, and a transmission medium. More particularly, the present invention relates to an information processing apparatus in which a plug for a Thin protocol is provided to make a Thin protocol used in the exchange of data performed on an IEEE1394 serial bus protocol which responds to an AV/C (Audio Visual/Control) command, a control method, and a transmission medium.

2. Description of the Related Art

Recently, a system has been proposed in which electronic apparatuses, such as AV apparatuses or personal computers, are connected to each other, for example, through an IEEE1394 serial bus so that data can be exchanged among them.

For example, in a disk camera and a printer which are connected to each other through an IEEE1394 serial bus, when an image photographed by a disk camera is desired to be printed by a printer, an FCP (Function Control Protocol) and an IEC61883 protocol which responds to an AV/C command are available. Also, at present, a Thin protocol has been proposed.

However, the above-mentioned Thin protocol does not respond to the AV/C command. Therefore, it cannot be used for apparatuses which respond only to an AV/C command.

SUMMARY OF THE INVENTION

An object of the present invention, which has been achieved in view of such circumstances, is to make a Thin protocol respond to an AV/C command by forming a plug for use with the Thin protocol in an information processing apparatus.

According to a first aspect of the present invention, there is provided an information processing apparatus such that the protocol is a protocol such that a plurality of connections can be formed in accordance with a request from an application layer among apparatuses which perform communications and a plurality of channels can be formed in each connection, and that descriptors of an input plug and an output plug of the protocol are provided.

According to a second aspect of the present invention, there is provided a control method such that the protocol is a protocol such that a plurality of connections can be formed in accordance with a request from an application layer among apparatuses which perform communications and a plurality of channels can be formed in each connection, and that an input plug and an output plug of the protocol are formed in the descriptors of the information processing apparatus and the printer, and predetermined data is written into the input plug and the output plug, so that the operation of the information processing apparatus and the printer is controlled.

According to a third aspect of the present invention, there is provided a transmission medium such that the protocol is a protocol such that a plurality of connections can be formed in accordance with a request from an application layer among apparatuses which perform communications and a plurality of channels can be formed in each connection, and that an input plug and an output plug of the protocol are formed in the descriptors of the information processing apparatus and the printer, and predetermined data is written into the input plug, and the output plug, so that the operation of the information processing apparatus and the printer is controlled.

In the information processing apparatus in accordance with the first aspect of the present invention, the control method in accordance with the second aspect of the present invention, and the transmission medium in accordance with the third aspect of the present invention, the protocol is a protocol such that a plurality of connections can be formed in accordance with a request from an application layer among apparatuses which perform communications and a plurality of channels can be formed in each connection, and that an input plug and an output plug of the protocol are formed in the descriptors of the information processing apparatus and the printer, and predetermined data is written into the input plug and the output plug, so that the operation of the information processing apparatus and the printer is controlled.

The above and further objects, aspects and novel features of the invention will become more apparent from the following detailed description when read in connection with the accompanying drawings.

BRIEF DESCRIPTION OF THE DRAWINGS

FIG. 5 is a view illustrating information held in a printer subunit.

FIG. 6 is a view illustrating a descriptor described in the printer subunit.

FIG. 7 is a view illustrating a command described in the printer subunit.

FIG. 8 is a view illustrating another command described in the printer subunit.

FIG. 12 is a view for providing a detailed description of FIG. 11.

FIG. 13 is a view illustrating a command stored by a control of FIG. 1.

FIG. 14 is a view for providing a detailed description of FIG. 11.

FIG. 15 is a view for providing a detailed description of FIG. 11.

DESCRIPTION OF THE PREFERRED EMBODIMENT

Figure 1:
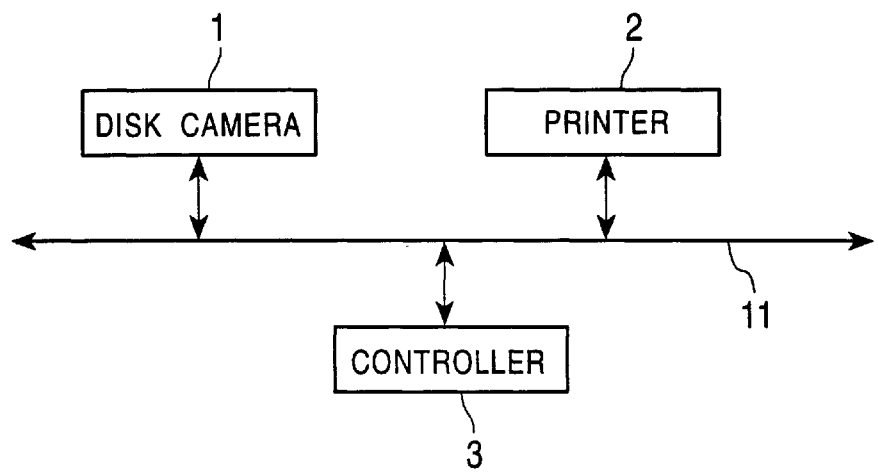
FIG. 1 is a block diagram showing an example of the construction of an information processing apparatus of the present invention.

FIG. 1 shows an example of the construction of an information processing system of the present invention. In this example of the construction, a disk camera 1, a printer 2, and a controller 3 are connected to each other through a 1394 bus 11. The controller 3 can be replaced with, for example, a television receiver. Also, the controller 3 may be provided in the disk camera 1 or the printer 2.

Figure 2:
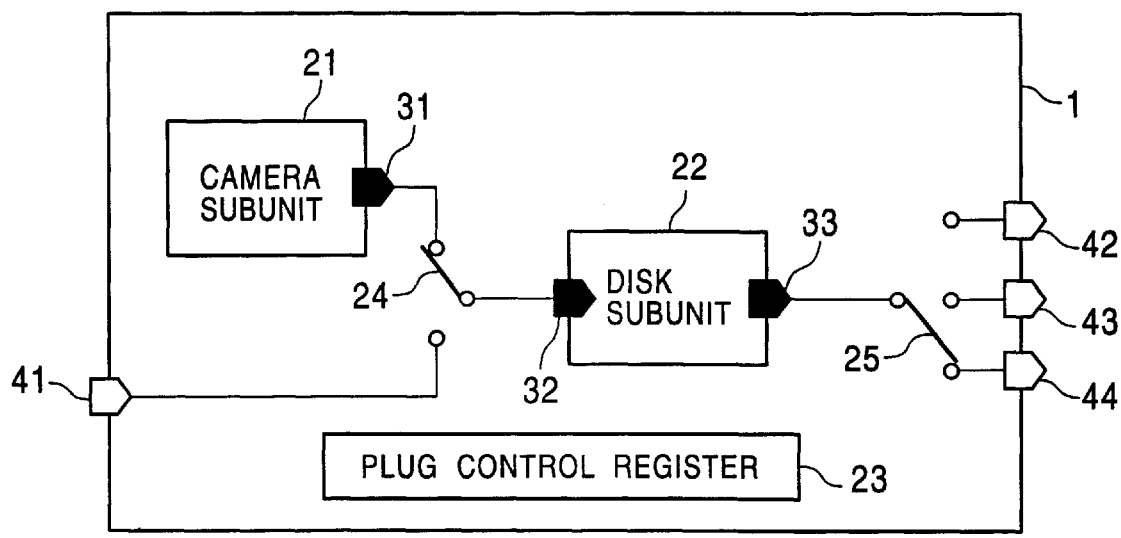
FIG. 2 is a function block diagram of a disk camera of FIG. 1.

FIG. 2 is a function block of the disk camera 1. A camera subunit 21 for performing a process, such as photography, causes data to be output from an SUO (SubUnit Output) plug 31 to a switch 24. An SI (Serial bus Input) plug 41 inputs data through the 1394 bus 11 and outputs it to the switch 24. The switch 24 selects the data from the SUO plug 31 and the data from the SI plug 41, and outputs it to an SUI (SubUnit Input) plug 32. A disk subunit 22 for reproducing and recording image data photographed by the camera subunit 21 and the image data input from the SUI plug 32 outputs data from an SUO plug 33 to a switch 25. The switch 25 outputs the data from the SUO plug 33 to an SO (Serial bus Output) plug 42, an EO (External Output) plug 43, or a TO (Thin Output) plug 44. A plug control register 23 controls the operation of each of the above-mentioned plugs, and a corresponding table between plugs to be described later and channels are written.

The SO plug 42 is a plug used for output to the 1394 bus 11, and for example, data based on an IEC61883 protocol is output. The EO plug 43 is a plug for output to other than the 1394 bus 11 and responds to an analog output. Also, the TO plug 44 is a plug which is used for output to the 1394 bus 11 and responds to the Thin protocol. As a result of the provision of the TO plug 44, all the outputs from these plugs respond to the AV/C command.

Figure 3:
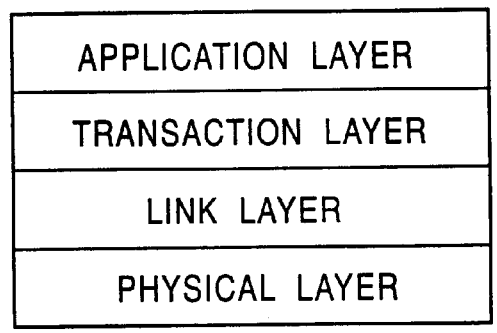
FIG. 3 is a view illustrating a protocol used on an IEEE1394 serial bus.

The features of the Thin protocol will now be described. On the IEEE1394 serial bus, a protocol of a layer structure such as that shown in FIG. 3 is used. The Thin protocol is an application layer. Also, in the Thin protocol, data is transmitted and received in the form of asynchronous packets. Furthermore, it is possible to form a plurality of channels within one connection.

Figure 4:
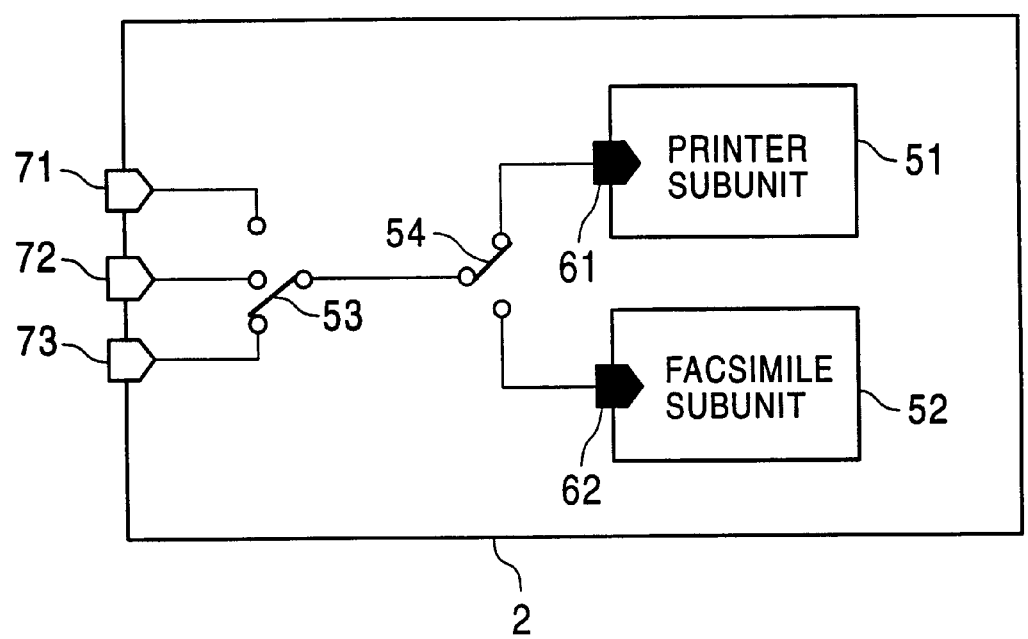
FIG. 4 is a function block diagram of a printer of FIG. 1.

FIG. 4 is a function block diagram of the printer 2. The plugs are used in such a way that data is input through the 1394 bus 11 to an SI (Serial bus Input) plug 71 and a TI (Thin Input) plug 73, and data other than through the 1394 bus 11 is input to an EI (External Input) plug 72. A switch 53 outputs one set of data of the data input to these three plugs to a switch 54. The switch 54 outputs the input data to an SUI plug 61 or an SUI plug 62.

In the printer subunit 51, first, as shown in FIG. 5, the engine performance of the printer, types of signals which can be handled, etc., are described as Printer Subunit dependent information. Also, as shown in FIG. 6, as a Printer Subunit Status Descriptor, the length of the descriptor, from which unit plug the signal is input, etc., are described. Furthermore, as shown in FIGS. 7 and 8, as a command, there are commands for the operation, such as the performance and stopping of the print, and a command for informing that the description written in the descriptor is changed.

Figure 9:
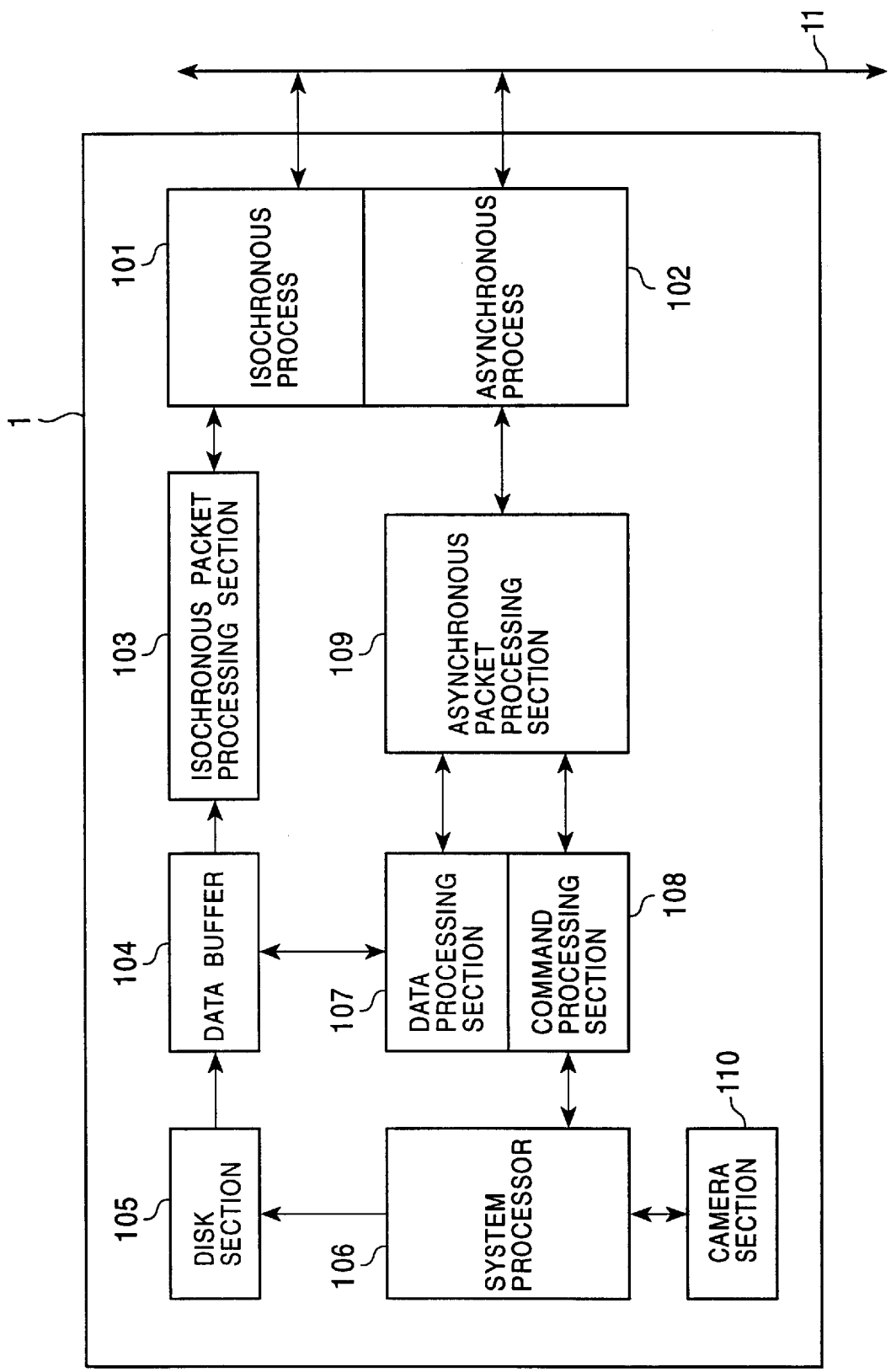
FIG. 9 is a block diagram showing an example of the construction of the disk camera of FIG. 1.

FIG. 9 is a block diagram showing an example of the construction of the disk camera 1. Image data is recorded in a disk section 105, and the data is transferred to a data buffer 104 and stored therein. The data stored in the data buffer 104 is transferred to a data processing section 107 or an isochronous packet processing section 103. The data transferred to the isochronous packet processing section 103 is transferred to an isochronous process 101, and is subjected to a modulation that conforms to the 1394 bus 11 and is output.

The data transferred to the data processing section 107 is transferred to an asynchronous packet processing section 109 where the data is formed into asynchronous packets and transferred to an asynchronous process 102. The asynchronous process 102 performs a modulation that conforms to the 1394 bus 11 on the transferred data and outputs it. A command processing section 108 performs a process of a command required for the Thin protocol. A camera section 110 performs a process, such as photo-taking of an image. The system processor 106 performs data reading control of the disk section 105, command processing control of the command processing section 108, the operation control of the camera section 110, and so on.

Next, a description is given of the operation for outputting data to the 1394 bus 11. The system processor 106 reads image data recorded in the disk section 105 and transfers the image data to the data buffer 104. The data transferred to the data buffer 104 is transferred to the isochronous packet processing section 103 when the data is transmitted in isochronous packets, and when the data is transmitted in asynchronous packets, the data is transferred to the data processing section 107.

The isochronous packet processing section 103 forms the transferred data into isochronous packets. The data which is formed into isochronous packets is transferred to the isochronous process 101, and is modulated into data that conforms to the 1394 bus 11 and is output.

The data transferred to the data processing section 107 is transferred to the asynchronous packet processing section 109. The data transferred to the asynchronous packet processing section 109 is formed into asynchronous packets, is transferred to the asynchronous process 102, is modulated into data that conforms to the 1394 bus 11, and is output.

When the data transferred through the 1394 bus 11 is a command, the command processing section 108 performs a process corresponding to the command, for example, the connection or disconnection of the plugs, etc.

Figure 10:
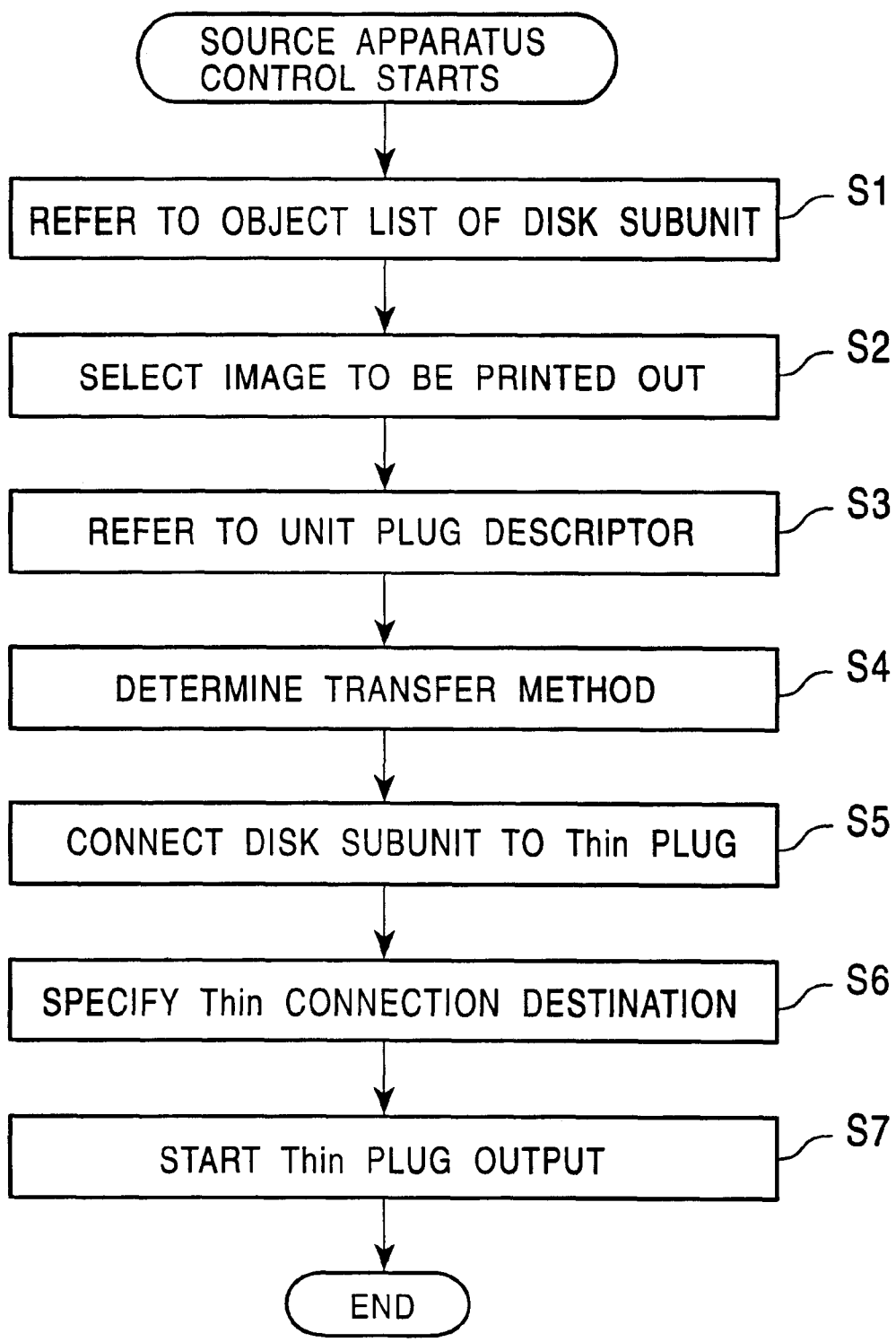
FIG. 10 is a flowchart illustrating the operation of each apparatus during data transfer.

Referring to the flowchart of FIG. 10, the operation of each apparatus is described by using an example in which an image recorded in the disk camera 1 is printed by the printer 2. In a case in which a user wants to display image data recorded in the disk camera 1 on a television receiver (not shown) and performs a predetermined operation, the process of the flowchart of FIG. 10 is started. In this case, the television receiver performs the role of the controller 3.

In step S1, in response to the operation of the user, the controller 3 reads an object list descriptor of a disk subunit 22 of the disk camera 1. In this descriptor, information (image data, year and date of photo-taking, etc.) recorded in the disk has been written. This information is displayed on the controller 3 (in this case, the television receiver).

Figure 11:
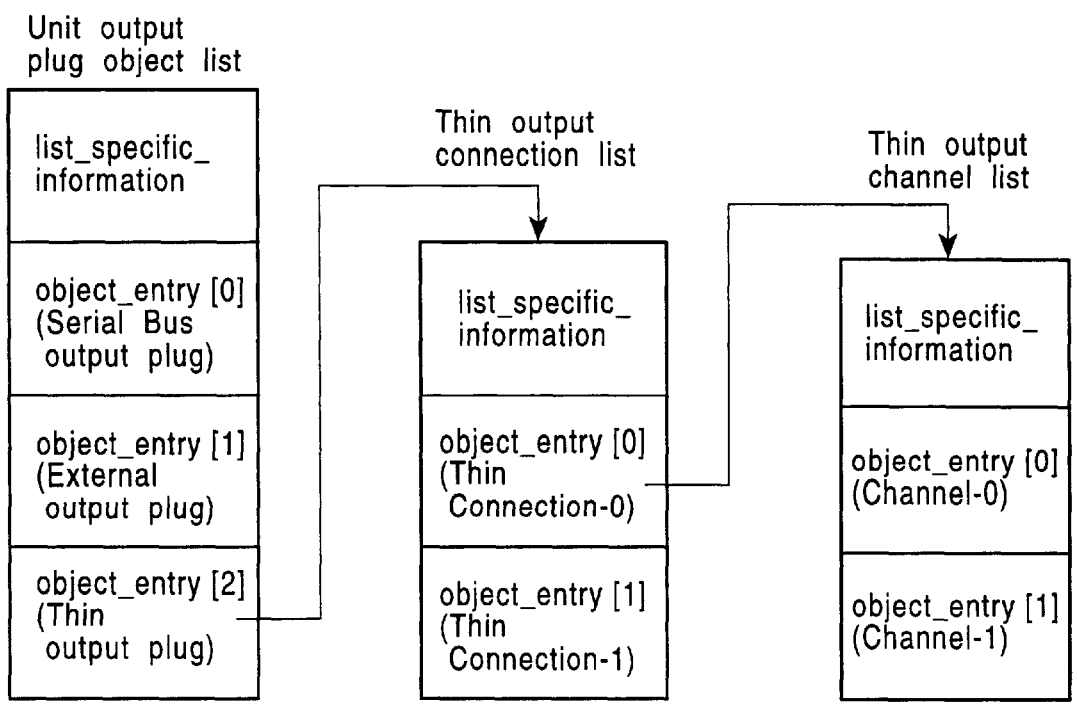
FIG. 11 is a view showing a unit plug descriptor.

In step S2, the user selects an image to be printed out while viewing the displayed screen. In step S3, the controller 3, as a process corresponding to the selection of the user, refers to a unit plug descriptor stored in the disk subunit 22. This unit plug descriptor, as shown in FIG. 11, is composed of a Unit Output Plug Object list, a Thin Output Connection list, and a Thin Output Channel list. The controller 3 first refers to the Unit Output Plug Object list, and in step S4, determines the transmission method.

In the Unit Output Plug Object list, entries are present in a number corresponding to the number of unit plugs. In this example, it is shown that after the list specific information, a Serial bus Output Plug, an External Output Plug, and a Thin Output Plug, the number of each of which is one, are present. In each entry, as shown in FIG. 12, information, such as a signal format which can be handled by a plug, a transfer format, and the like, is described. If the information is described in the sequence of formats recommended by the disk camera 1 (unit), this is useful for a determination of the format in which the controller 3 should transfer the data. However, since the Thin protocol is a general-purpose data transfer protocol, the data type and the data format need not be particularly limited, and in this case, neither the type nor the data format need be described. Therefore, FIG. 12 shows a case in which there are limitations.

It is assumed that in step S4, the controller 3 determines the transmission method to be an Object entry [2] (Thin Output Plug). In step S5, in accordance with this determination, the controller 3 issues a request for connecting the disk subunit 22 of the disk camera 1 to the TO plug 44 (Thin plug). This request is performed in accordance with the command list recorded in the controller 3, such as that shown in FIG. 13. Then, in accordance with this request, the SUO plug 33 of the disk subunit 22 is connected to the TO plug 44 by the switch 25.

In step S6, the controller 3 specifies a connection destination with the TO plug 44. This connection destination is specified as a result of the reference to the Thin Output Connection list shown in FIG. 11. In the Thin Output Connection list, entries are present in a number corresponding to the number of connections which are to be connected or connected in Thin. In each entry of this Thin Output Connection list, as shown in FIG. 14, a connection control is described first. This connection control is a field in which a connection or disconnection request is written by the controller 3. The connection status is a read-only field indicating the current connection status. The other information are the ID of the connected node, the type of the transfer model, and the size of data to be transferred.

In the Connection Control of this list, a Connect req indicating a connection request is selected, next, a node ID on the 1394 bus 11 of the printer 2 is described in the place of the node Unique ID, then, a physical ID of the printer 2 is described in the place of the node ID, so that a printer connection request is issued to the Thin protocol. In response to this request, the TO plug 44 of the disk camera 1 is connected to the TI plug 73 of the printer 2.

When the connection of the plugs is completed, in step S7, the controller 3 requests the disk camera 1 to start outputting data. At this time, first, the controller 3 refers to the Thin Output channel list shown in FIG. 11. The Thin Output channel list is determined when a plurality of data is transmitted within one connection. In each entry of this Thin Output channel list, as shown in FIG. 15, the request, the status, and the type of data transfer are described. In step S7, the controller 3 selects a send req of a send data control and requests the disk camera 1 to transfer data. In response to the request, the disk camera 1 starts transferring data to the printer 2.

Figure 16:
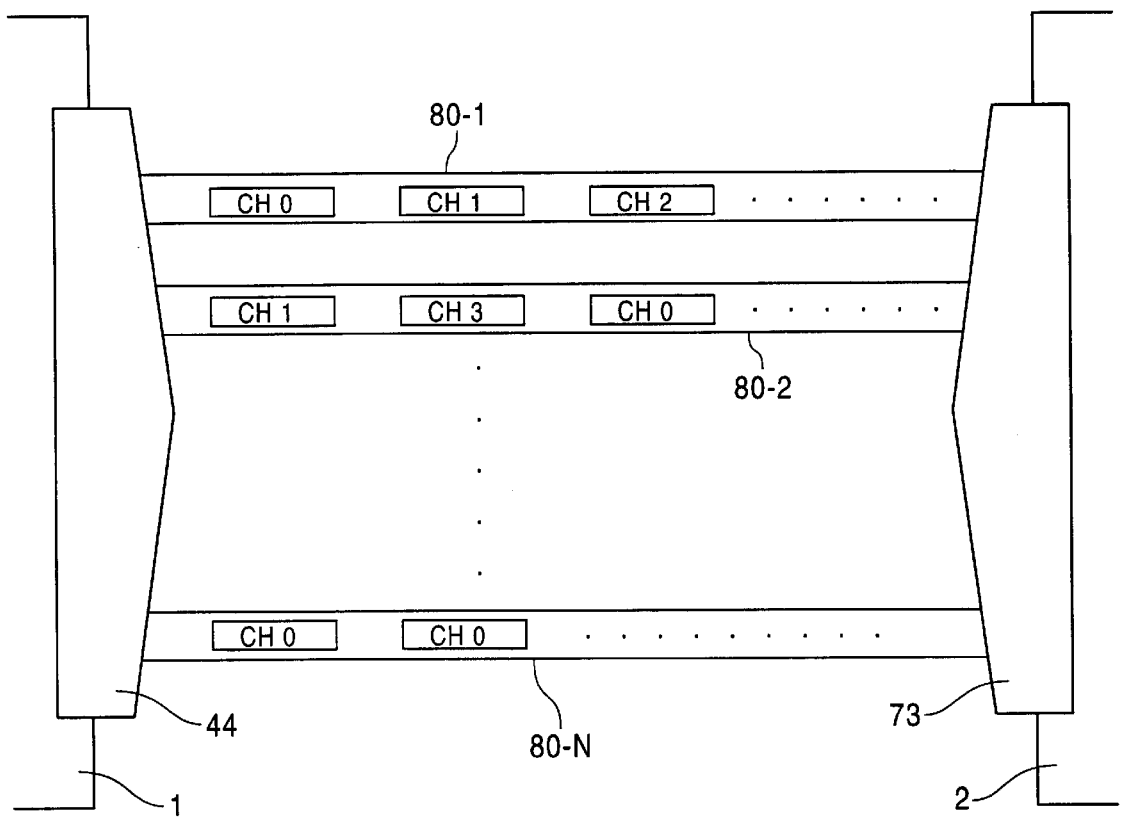
FIG. 16 is a view illustrating connection between plugs.

The state in which the disk camera 1 is connected to the printer 2 in the manner described above is shown in FIG. 16. Connections 80-1 to 80-N (hereinafter simply referred to as a connection 80 when there is no need to individually distinguish between the connections 80-1 to 80-N) are formed in the 1394 bus 11 between the TO plug 44 and the TI plug 73. Each connection 80 shows a state in which data of a plurality of channels is transmitted and received.

Figure 17:
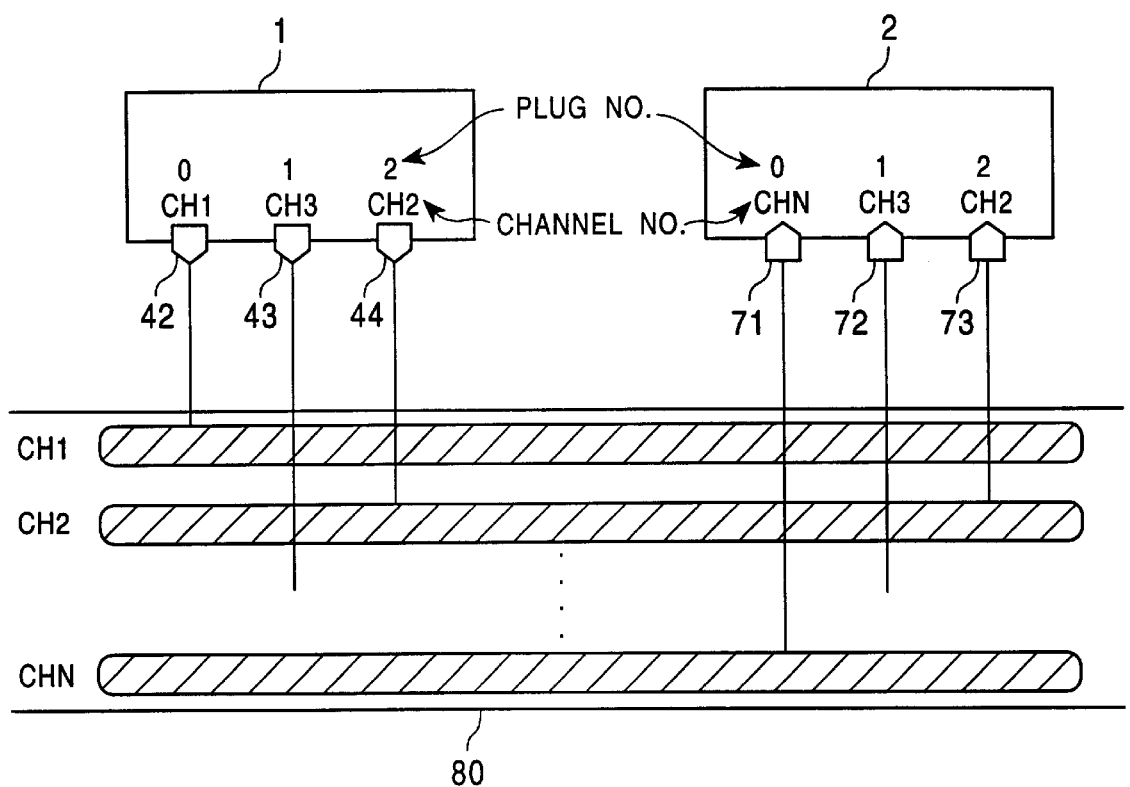
FIG. 17 is a view illustrating connection between plugs.

FIG. 17 is a view illustrating the relationship between the connection 80 and each plug. Within the connection 80, data of channels (CH) 1 to N is transmitted and received. A number is assigned to each plug in sequence starting from 0. This plug No. corresponds to the entry No. of the Unit Output Plug Object list (FIG. 11) when the unit plug descriptor is referenced and the transmission method is determined in steps S3 and S4 of FIG. 10.

Each plug corresponds to the channel determined in step S7 of FIG. 10. For example, plug No. of the TO plug 44 of the disk camera 1 is 2, so that data to channel 2 is output. Also, the plug No. of the TI plug 73 of the printer 2 is 2, and channel No. is 2. The corresponding relationship between each of these plug Nos. and channel No. is described as a descriptor in the plug control register 23 (FIG. 2) of the disk camera 1. The data output from the TO plug 44 of the disk camera 1, as channel 2, is passed through the connection 80 and input to the TI plug 73 of the printer 2.

By providing a plug for the Thin protocol in the manner described above, it is possible to use the Thin protocol also in the AV/C command.

Although in the above, the disk camera 1 is on the transmission side and the printer 2 is on the receiving side, it can be determined as desired which apparatus should be on the receiving side or which should be on the transmission side.

The computer program which executes the above-described various types of instructions may be transmitted to a user through a recording medium, such as a magnetic disk or a CD-ROM, or through a transmission medium, such as a network, so that the computer program is used in such a way that it is recorded in a built-in RAM or hard disk as required.

According to the information processing apparatus, the control method, and the transmission medium of the present invention, the protocol is a protocol such that a plurality of connections can be formed on a basis of a request from an application layer among apparatuses which perform communications, and a plurality of channels can be formed in each connection. An input plug and an output plug of the protocol are formed in the descriptors of the information processing apparatus and the printer, and predetermined data is written into the input plug and the output plug, so that the operation of the information processing apparatus and the printer is controlled. Therefore, it is possible to use the Thin Protocol also in the AV/C command.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A control method for use with a printer and an information processing apparatus connected for communicating an audio/visual control command to each other by using a predetermined Thin protocol for an asynchronous exchange of data performed through an IEEE1394 serial bus, comprising the steps of:

forming a plurality of connections in accordance with a request from an application layer among apparatuses for performing asynchronous communications;

forming a plurality of channels in each connection of said plurality of connections;

forming an input plug and an output plug of said predetermined Thin protocol in descriptors of said information processing apparatus and said printer; and writing predetermined data into said input plug and said output plug for controlling operation of said information processing apparatus and said printer.

2. A transmission medium for transmitting a computer program for controlling a printer and an information processing apparatus connected for communicating an audio/visual control command to each other by using a predetermined Thin protocol used in an asynchronous exchange of data performed through an IEEE1394 serial bus, wherein said predetermined Thin protocol is designed for allowing formation of a plurality of connections in accordance with a request from an application layer among apparatuses for performing asynchronous communications, and formation of a plurality of channels in each connection of said plurality of connections, an input plug and an output plug of said predetermined Thin protocol are formed in descriptors of said information processing apparatus and said printer, and predetermined data is written into said input plug and said output plug for controlling operation of said information processing apparatus and said printer.

* * * * *